(12) United States Patent
Tam

(10) Patent No.: US 6,556,274 B2
(45) Date of Patent: Apr. 29, 2003

(54) PROCESS FOR FULL-AUTOMATIC AND SYNCHRONOUS QUICK THERMOPRINTING OF STEREOSCOPIC COLOR FILM AND APPARATUS ADOPTING THE PROCESS

(75) Inventor: Chit Ho Tam, Tuen Mun (HK)

(73) Assignee: Wan Ho Industrial Co., Ltd., Tuen Mun (HK)

( * ) Notice: Subject to any disclaimer, the term of this patent is extended or adjusted under 35 U.S.C. 154(b) by 0 days.

(21) Appl. No.: 09/966,530

(22) Filed: Sep. 28, 2001

(65) Prior Publication Data

US 2002/0041366 A1 Apr. 11, 2002

(30) Foreign Application Priority Data

Sep. 30, 2000 (CN) .......................... 00126589 A

(51) Int. Cl.$^7$ ........................... G03B 27/32; G03B 27/52
(52) U.S. Cl. ........................................... 355/22; 355/27
(58) Field of Search .................. 355/27, 29, 40–41, 355/22, 85, 88; 348/51; 359/622; 101/128.21; 347/220, 218

(56) References Cited

U.S. PATENT DOCUMENTS 4,005,932 A * 2/1977 Gates ........................... 355/32

5,622,687 A 4/1997 Krishnan et al.

FOREIGN PATENT DOCUMENTS

CN 98223536.4 8/1999

* cited by examiner

Primary Examiner—Henry Hung Nguyen
(74) Attorney, Agent, or Firm—Jordan and Hamburg LLP

(57) ABSTRACT

A process for full-automatic and synchronous quick thermoprinting of stereoscopic color film and apparatus adopting the process uses the internationally accepted nontoxic oil ink to design patterns on a transfer medium, which medium is in turn absorbed by a special thin film so as to be attached to a printing stock, whereupon the thus prepared printing stock is put into the apparatus. By gas pressure a pressure column of an inclined surface is pushed downward so as to contact and press a sliding mold jig of the inclined surface to synchronously move toward the center, so that each outer mold thermocompresses onto the outer surface of the printing stock from upper, left, right, front and rear directions simultaneously. After a predetermined period at predetermined temperature, the mold automatically returns to its original position. The disadvantages of manual operation which is of lower efficiency and unstable quality are thus overcome.

6 Claims, 1 Drawing Sheet

PROCESS FOR FULL-AUTOMATIC AND SYNCHRONOUS QUICK THERMOPRINTING OF STEREOSCOPIC COLOR FILM AND APPARATUS ADOPTING THE PROCESS

FIELD OF THE INVENTION

The present invention relates to a process for thermoprinting of color film and an apparatus adopting the process, in particular, to a process for full-automatic and synchronous quick thermoprinting of stereoscopic color film and apparatus adopting the process.

BACKGROUND OF THE INVENTION

Currently, the processes of decorating the surfaces of articles with color pattern are classified into screen-printing, transfer printing, gold stamping and heat embossing and the like The above processes have a common disadvantage, that is, for an article with irregular and uneven three-dimensional surface, the surface can only be decorated with color pattern manually, and the pattern is not delicate and vivid enough.

SUMMARY OF THE INVENTION

An object of the present invention is aimed to solve the problems mentioned-above, and to provide an apparatus for full-automatic and synchronous quick thermoprinting of stereoscopic color film, which can automatically and quickly thermoprint the whole external surface of a stereoscopic printing stock with the color pattern at low temperature at a single step.

To achieve the object of the invention, according to one aspect of the invention, there is provided an apparatus for full-automatic and synchronous quick thermoprinting of stereoscopic color film, the apparatus comprising:

a driving device provided at the upper portion of a frame;

a pressure rod which is driven by the driving device, the lower end of the pressure rod being connected with an upper form board;

a number of guide columns mounted on the top surface of the upper form board for guiding the movement of the upper form board;

an upper mold jig provided at the center of the bottom surface of the upper form board;

a lower form board provided at the lower portion of the frame;

a lower mold jig mounted at the center of the top surface of the lower form board, a number of sliding mold jigs provided on the top surface of the lower form board around the lower mold jig, said sliding jigs being mounted movably so as to be able to slide radially; each of said sliding mold jigs being provided with a position restorating device;

means for synchronously moving said sliding mold jigs inwards toward a printing stock;

outer molds respectively fitted to the upper mold jig and the sliding mold jigs, each of the outer molds being provided with a heating wire and a temperature probe;

inner molds, which are made of heat-resistant rubber material, respectively fitted to said outer molds, each of said inner molds having a shape corresponding to the shape of a corresponding part of the printing stock;

a lower mold fitted to the lower mold jig, the external shape of the lower mold corresponding to the internal shape of the printing stock, and the lower mold being provided with an heating wire and a temperature probe.

According to another aspect of the invention, there is provided a process for thermoprinting of stereoscopic color film, comprising the steps of:

injecting, coating or printing the internationally recognized nontoxic oil ink onto a transfer media to obtain a desired pattern or characters;

putting a special film onto the transfer media to overlap the nontoxic ink pattern or characters, so as for the pattern or characters to adhere to the special thin film temporarily;

soaking the transfer media together with the film;

taking the whole transfer media together with the film when the film with the pattern adhered thereto starts to separate from the transfer media and applying it on a desired position of the printing stock;

pushing the film with hand so that the film shifts slightly relative to the transfer media, and then pulling out the transfer media slowly while holding the film in position;

positioning the film at a desired position on the printing stock, and flattening the film while squeezing out the water;

air-drying the film;

putting the printing stock on a lower mold of an apparatus for thermoprinting of stereoscopic color film which has been heated to a predetermined temperature, the external shape of the lower mold corresponding to the internal shape of the printing stock;

thermocompressing the outer surface of the printing stock with a number of molds at a predetermined temperature for a predetermined time period, the shape of each of the molds corresponding to the shape of a corresponding part of the printing stock.

With the present invention, the whole external surface of a stereoscopic printing stock can be thermoprinted with color pattern quickly at low temperature at a single step, improving the efficiency and quality as compared with the conventional process and apparatus.

BRIEF DESCRIPTION OF THE DRAWINGS

The preferred embodiments of the invention will be described below in connection with accompanying drawings, in which.

DETAILED DESCRIPTION OF THE PREFERRED EMBODIMENTS

Figure 1:
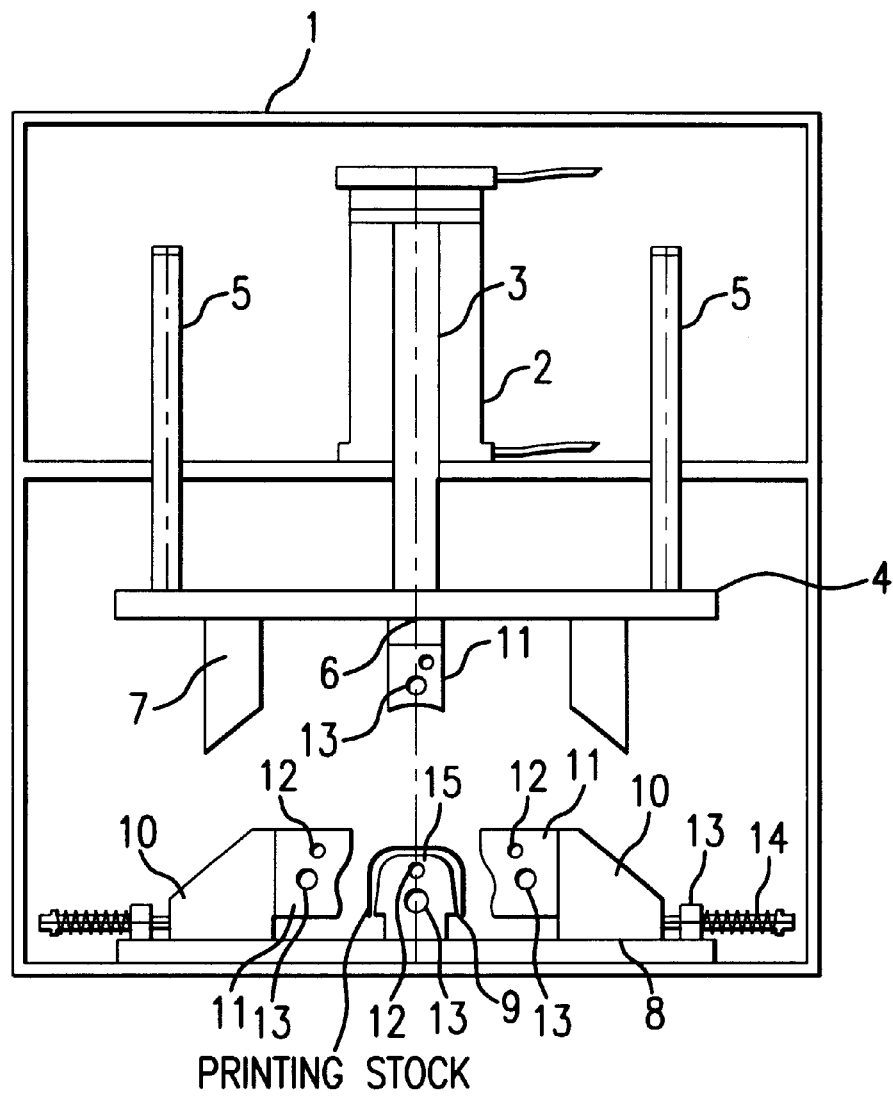
FIG. 1 is a schematic front view of the apparatus according to the invention.

FIG. 1 is a schematic front view of the apparatus in accordance with the invention. As shown in FIG. 1, the apparatus includes a frame 1, and a gas pressure device 2 is mounted at the upper portion of the frame 1. The pressure rod 3 of the gas pressure device 2 is connected with an upper form board 4. On the top surface of the upper form board there are provided four guide columns 5 for guiding the movement of the upper form board. At the center of the bottom surface of the upper form board there is provided an upper mold jig 6, and four pressure columns 7 with inclined surface at their lower ends are mounted on the bottom surface around the upper mold jig.

A lower form board 8 is provided at the lower portion of the frame 1. A lower mold jig 9 is mounted at the center of the top surface of the lower form board, and four sliding mold jigs 10 with inclined surface at their upper end are mounted on the top surface around the lower mold jig 9. The inclined surfaces of the pressure columns 7 cooperate with the inclined surfaces of the sliding mold jigs 10 so as to move the sliding mold jigs 10 inwards during operation. At the outside of each sliding mold jig 10, there is provided a position restorating device which includes a rod 13 and a return spring 14, the position restorating device is used to return the sliding mold jig to its original position after operation. Outer molds 11 are respectively fitted to the upper mold jig 6 and the sliding mold jigs 10, heating wire 12 and temperature probe 13 are provided in each of the outer molds. Inner molds, which are made of heat-resistant rubber material, are fitted to the outer molds. The inner molds are designed and manufactured according to the corresponding external shape of a printing stock. A lower mold 15 which is made of e.g. metal material, is fitted to the lower mold jig 9. The lower mold 15 is designed and manufactured according to the internal shape of the printing stock, and heating wire and temperature probe are provided in the lower mold.

The process for thermoprinting stereoscopic color film on a printing stock using the apparatus of the invention will be described below.

Firstly, the internationally recognized nontoxic oil ink is injected, coated or printed on a transfer media such as a paper backing to obtain a desired pattern or characters. Thereafter, the transfer media with the pattern or characters is overlapped with a special thin film so as for the pattern or characters to adhere to the special thin film temporarily. Then the transfer media together with the film is soaked, and when the film with the color pattern adhered to it (referred to as color film) starts to separate from the paper backing, a worker may take the whole paper backing together with the film and apply or place it on a desired position on a printing stock; then the worker can push the color film with hand so that the color film shift slightly relative to the paper backing. At this time, the worker can pull out the paper backing slowly while holding the color film in position. After the paper backing is pulled out, the color film is positioned at the desired place, then the worker can flatten the color film while squeezing out the water. After the color film is air-dried, the following thermoprinting process can be carried out. The worker presses the button for the heating wire to heat the lower mold 15 to a predetermined temperature e.g. 120°, and after the lower mold 15 reaches the predetermined temperature, the worker puts the printing stock with the color film on the lower mold of the thermoprinting apparatus the parameters of which have been set according to the design requirements. Then the worker presses the buttons for the gas pressure device 2 to operate the apparatus. The pressure rod 3 drives the upper form board 4 and hence the upper mold jig 6 to move downwards. The inclined surfaces of the pressure columns 7 contact and press the corresponding inclined surfaces of the sliding mold jigs 10 to synchronously move the sliding mold jigs toward the center, so that all the molds thermocompress the outer surface of the printing stock form upper, left, right, front and rear directions simultaneously. This thermocompressing process lasts 30 seconds at the predetermined temperature 120°. When the predetermined processing has elapsed, the pressure rod 3 of the air pressure device 2 automatically moves upward. Under the action of the return springs 14, the sliding mold jigs 10 return to their original positions. Then, the printing stock is took away, and the operation of the color film thermoprinting is completed.

The invention has been described in correction with the embodiments, those skilled in the art will appreciate that various modifications are possible without departing from the spirit and scope of the invention, For example, the number of the sliding molds may be more or less depending on the particular external shape of the printing stock to be thermoprinted. In the explanatory embodiment, the inclined surfaces are used to drive the sliding mold jigs, but other driving means can be used; and furthermore, the air pressure device may be replaced by hydraulic device or manual drive device.

What is claimed is:

1. An apparatus for full-automatic and synchronous quick thermoprinting of stereoscopic color film, comprising:
    a driving device provided at the upper portion of a frame;
    a pressure rod which is driven by the driving device, the lower end of the pressure rod being connected with an upper form board;
    a plurality of guide columns mounted on the top surface of the upper form board for guiding the movement of the upper form board;
    an upper mold jig provided at the center of the bottom surface of the upper form board;
    a lower form board provided at the lower portion of the frame;
    a lower mold jig mounted at the center of the top surface of the lower form board;
    a plurality of sliding mold jigs provided on the top surface of the lower form board around the lower mold jig, said sliding jigs being mounted movably so as to be able to slide radially; each of said sliding mold jigs being provided with a position restoring device;
    means for synchronously moving said sliding mold jigs inwards toward a printing stock;
    outer molds respectively fitted to the upper mold jig and the sliding mold jigs, each of the outer molds being provided with a heating wire and a temperature probe;
    inner molds, which are made of heat-resistant rubber material, respectively fitted to said outer molds, each of said inner molds having a shape corresponding to the shape of a corresponding part of the printing stock;
    a lower mold fitted to the lower mold jig, the external shape of the lower mold corresponding to the internal shape of the printing stock, and the lower mold being provided with a heating wire and a temperature probe.

2. The apparatus according to claim 1, further comprising a plurality of pressure columns mounted on the bottom surface of the upper form board around the upper mold jig, each of said pressure columns having an inclined surface at its lower end, and each of said sliding mold jigs having a corresponding matching inclined surface at its upper end, the inclined surface of the pressure column and the inclined surface of the sliding mold jig cooperating to move the sliding mold jig toward the printing stock during operation.

3. The apparatus according to claim 1, wherein the number of said pressure columns is four, and the number of said sliding mold jigs are four.

4. The apparatus according to claim 1, wherein said lower mold is made of metal material.

5. The apparatus according to claim 1, wherein said driving device is an air pressure device.

6. The apparatus according to claim 1, wherein said position restoring device includes a rod and a return spring.

* * * * *